United States Patent [19]
Stumphauzer et al.

[11] Patent Number: 5,460,846
[45] Date of Patent: Oct. 24, 1995

[54] PROCESS AND APPARATUS FOR RAPIDLY CARBONATING A LIQUID BEVERAGE USING A SINGLE PRESSURE VESSEL

[75] Inventors: William C. Stumphauzer, 44550 Stang Rd., Elyria, Ohio 44035; Hugh F. Groth, Richfield, Ohio

[73] Assignee: William C. Stumphauzer, Elyria, Ohio

[21] Appl. No.: 337,870

[22] Filed: Nov. 14, 1994

Related U.S. Application Data

[63] Continuation-in-part of Ser. No. 215,424, Mar. 21, 1994, abandoned.

[51] Int. Cl.$^6$ ................................. A23L 2/00; B01F 3/00
[52] U.S. Cl. ................... 426/477; 99/323.1; 261/DIG. 7
[58] Field of Search ......................... 426/477; 99/323.1, 99/323.2; 261/DIG. 7; 222/1, 129.1

[56] References Cited

U.S. PATENT DOCUMENTS

| | | | |
|---|---|---|---|
| 2,447,716 | 8/1948 | Rowe | 426/477 |
| 4,040,342 | 8/1977 | Austin et al. | 261/DIG. 7 |
| 4,222,972 | 9/1980 | Caldwell | 426/477 |
| 4,458,584 | 7/1984 | Annese et al. | 99/323.1 |
| 4,466,342 | 8/1984 | Basile et al. | 99/323.1 |
| 4,475,448 | 10/1984 | Shoaf et al. | 99/323.1 |
| 5,260,081 | 11/1993 | Stumphauzer et al. | 426/477 |

*Primary Examiner*—George Yeung
*Attorney, Agent, or Firm*—Paul E. Milliken; Lee A. Germain

[57] ABSTRACT

A beverage carbonator constructed as a pitcher shaped pressure vessel which functions as a carbonation chamber and which has a water canister and a gas generation chamber removably positioned inside the carbonation chamber. Carbon dioxide is produced by releasing internally stored water from the water canister into a carbon dioxide generating chemical in the gas generation chamber and then the carbon dioxide passes into the carbonation chamber where it is dissolved into a liquid beverage.

41 Claims, 4 Drawing Sheets

PROCESS AND APPARATUS FOR RAPIDLY CARBONATING A LIQUID BEVERAGE USING A SINGLE PRESSURE VESSEL

RELATED INVENTIONS

This invention is a continuation-in-part of Ser. No. 08/215,424, filed Mar. 21, 1994, now abandoned.

FIELD OF THE INVENTION

This invention relates to carbonated beverage machines and in particular to a portable apparatus for rapidly carbonating liquids with chemically generated carbon dioxide produced in a gas generation chamber located inside a pressure vessel adjacent to a carbonation chamber containing the liquid to be carbonated. The generated carbon dioxide is passed from the gas generation chamber to the carbonation chamber to carbonate the liquid.

The present invention is an improvement over our prior invention described and claimed in our prior U.S. Pat. No. 5,260,081 issued Nov. 9, 1993.

BACKGROUND OF THE INVENTION

Carbonated beverages range in variety from carbonated water, knows as soda water or sparkling water, to a carbonated water flavored with natural or artificial flavors such as orange, lemon-lime, cola, and many more.

The amount of carbon dioxide gas dissolved into these products is usually referred to as Volume of $CO_2$ per Volume of Liquid. The higher the volume of $CO_2$ per unit Volume of Liquid, the greater the sparkle and effervescence of the beverage. Although the desirable level of carbonation in a beverage is a matter of personal preference, packaged soft drinks are usually made with 3.5 to 4.0 volumes of carbon dioxide for colas, 4.0 to 5.0 Volumes of $CO_2$ for seltzers and soda water and generally less that 3.0 volumes for orange flavor. One of the disadvantages of packaged carbonated beverages is that the carbonation level is fixed and not available at different levels to suit different personal tastes.

Other disadvantages of packaged carbonated beverages include the unnecessary cost of packaging and transportation of a product that is comprised essentially of water and the cost of disposal or recycling of the package. Still further is the problem that once the pressurized beverage container is open to the atmosphere, the beverage left unconsumed and unpressurized tends to lose carbonation and go flat thus wasting the unconsumed portion.

Several products have been developed to overcome the above noted problems and make possible the preparation of carbonated beverages in the home. Many of these products are described in several prior art patents discussed in our prior U.S. Pat. No. 5,260,081 and for the sake of brevity, these patents will not be repeated in this specification.

One of these prior patents which should be mentioned, however, is U.S. Pat. No. 4,040,342 (Austin), which discloses a gas generating chamber with a gas conduit extending into a carbonating chamber. After the chemical reaction is activated, the carbon dioxide flows into the carbonating chamber and carbonates the liquid contained therein. There are several limitations and problems with this device.

First, the time required to carbonate the liquid to 3 or more Volumes of $CO_2$ is fifteen minutes or greater. This is because the process of dissolving carbon dioxide into liquid occurs in two mechanisms; one quite rapid and the other quite slow. Some of the gas dissolves into the liquid as it bubbles to the surface and fills the head space of the carbonation tank. This $CO_2$ solution process occurs quite rapidly though it is, of course, dependent upon the rate of the chemical reaction producing the $CO_2$. Pressurized $CO_2$ in the head space acting upon the surface of the liquid is the other gas absorption mechanism. This absorption rate is slow because of the fixed interfacial exposure area between the $CO_2$ and the liquid. If this interfacial exposure area could be increased by agitation or by turbulent mixing as is taught by U.S. Pat. No. 4,719,056 (Scott) then $CO_2$ absorption would occur far more rapidly.

The other problem is the likely occurrence of transfer of some of the salt by-products of the $CO_2$ generation reaction into the liquid to be carbonated.

The reaction of edible acids (such as citric) with carbonates (such as sodium bicarbonate) in an aqueous solution is an endothermic reaction. When the reaction is first initiated, therefore, it is at its maximum temperature and its fastest reaction rate. In addition, the maximum amount of fuel for the reaction is present when it first begins. Therefore, during its initial stages the reaction produces considerable foaming and surface effervescence releasing a mist of reactant salt spray into the carbon dioxide gas being generated. This salt mist enters the carbonation chamber and ultimately the liquid being carbonated.

If hot water is used as the reactant water, the reaction rate is accelerated even further and salt contamination increases further.

For improved consumer convenience, the direct carbonation of premixed beverage is more desirable than the carbonation of unflavored water to which a flavoring must be added with each serving of soda water dispensed. With the Austin apparatus, U.S. Pat. No. 4,040,342, direct carbonation of premixed beverages would not be practical because premix flavoring syrups typically contain sugar and other ingredients that sufficiently alter the surface tension of the water syrup mix to cause the mixture to foam profusely; thus expelling much of the carbonation as it is dispensed from the pressurized carbonation vessel into a receptacle at atmospheric pressure. Most commercial soda fountains meter and mix flavoring syrup into the carbonated water after the water is dispensed from the pressurized carbonation vessel; therefore, when the syrup and carbonated water are combined, they are at atmospheric pressured (a process know in the industry as "post mix") and the foaming problem is avoided.

Three U.S. Patents which should be mentioned are U.S. Pat. Nos. 4,458,584 (Annese et al.), 4,466,342 (Basile et al.) and 4,475,448 (Shoaf et al.) These patents are all closely related to each other and describe a carbonation device in which a beverage container has a separate compartment inserted therein for holding carbon dioxide producing chemicals and a separate quantity of water is added to the chemicals before closing the lid to generate carbon dioxide gas for carbonation of a liquid beverage in the container. The containers in the above three patents do not have an overpressure relief valve, are not capable of withstanding the higher carbonation pressures generated by the present invention and would provide slower carbonation than the present invention. The present invention is easier to operate since the chemical reaction is started after closing the lid rather than while the lid is open.

OBJECTS OF THE INVENTION

One object of this invention is to provide a means to rapidly carbonate liquids including premixed beverages, without the need for special water soluble packaging to contain the carbon dioxide producing chemicals.

Another object of the invention is to provide an apparatus that governs the rate of reaction of the carbon dioxide generating chemicals to reduce the occurrence of reactant salt spray contamination of the beverage.

A further object of the invention is to provide a portable, easy-to-store beverage carbonating chamber that also serves as a storage container with a releasable dispensing spout.

An even further object of the invention is to provide a simple easy to use beverage carbonator which uses only one pressure vessel which is subdivided into a gas generation chamber and a carbonation chamber.

These and other objects of the invention will become more fully apparent in the following specification and the attached drawings.

SUMMARY OF THE INVENTION

This invention is a process and apparatus for rapidly carbonating a liquid beverage using a single pressure vessel comprising: a pressure vessel having a top opening therein, a removably attachable lid sealingly closing the top opening of the pressure vessel, a removeable container assembly positioned inside the pressure vessel at the bottom thereof, the container assembly forming a gas generation chamber at the bottom of the assembly for containing a quantity of carbon dioxide generating compound, and a water container above the gas generation chamber for retaining a quantity of water, the water container having a top opening in communication with the carbonation chamber and a bottom opening in communication with the gas generation chamber, a moveable bottom closure member sealingly closing the bottom opening of the water container to retain water therein, a top closure member closing the top opening of the water container to separate the interior of the water container from the carbonation chamber, the top closure member having a gas outlet in communication between the interior of the water container and the carbonation chamber, retaining means within the carbonation chamber to hold the container assembly at a fixed location within the pressure vessel, actuation means extending between the bottom closure member of the water container and the exterior of the pressure vessel to cause opening of the bottom closure member to release water from the water container into the gas generation chamber, means to release pressure from the carbonation chamber, and outlet means to remove liquid from the carbonation chamber.

DESCRIPTION OF THE PREFERRED EMBODIMENTS

Figure 1:
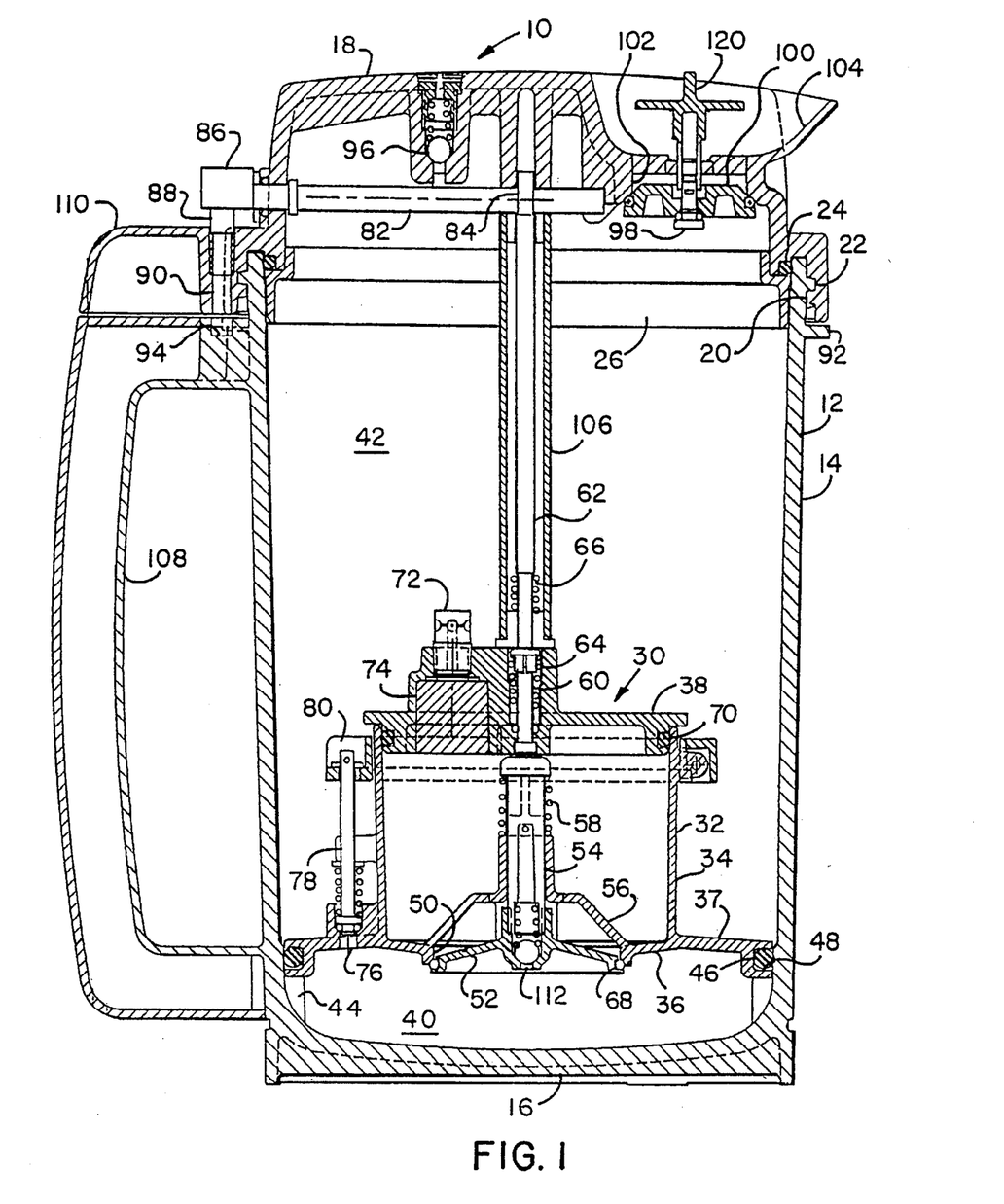
FIG. 1 is an elevational sectional view of one embodiment of the invention showing all the assembled parts of the apparatus.

Referring now to FIG. 1, the numeral 10 indicates the overall apparatus which is a portable carbonation machine for rapidly carbonating liquid beverages. The main body of the carbonation machine 10 is a cylindrical pressure vessel 12 having a continuous cylindrical sidewall 14, a closed bottom 16 integral with the sidewall 14 and an open top which is sealingly closed by a top lid 18 held in place by internal threads 20 which engage external threads 22 on the periphery of the vessel 12 near the top thereof. An O-ring 24 creates as seal between the lid 18 and an inner wall surface of the vessel 12. An internal ring 26 aids in retaining the 0ring 24 in sealing position.

A water canister assembly 30 is positioned inside the vessel 12 near the bottom 16 thereof. The canister assembly 30 has a cylindrical canister 32 having a cylindrical sidewall 34, a bottom 36 and a top closure member 38. The bottom 36 has a radially outwardly extending annular extension flange 37 which extends between the outer circumference of the canister wall 34 and the vessel sidewall 14 to sealingly divide the vessel 12 into a carbon dioxide gas generating chamber 40 below the canister 32 and the flange 37, and a carbonation chamber 42 above the canister 32 and the flange 37. The canister 32 and the flange 37 together form a partition between the chambers 40 and 42. The flange 37 rests on a ledge 44 which maintains the proper spacing for the chambers 40 and 42. An O-ring 46 is positioned in an annular groove 48 in the periphery of the flange 37 to seal against the sidewall 14.

The canister bottom 36 has a centrally located drain opening 50 therein which is sealed by a normally closed bottom closure plate 52 attached to a center support rod 54. The rod 54 passes through a spider bracket 56 and is urged upwardly by a coil spring 58 so that the closure plate 52 remains in the closed position with respect to the bottom 36 unless the rod 54 is moved downwardly by an intermediate rod 60 moveably mounted in a hole through the top closure member 38, which rod 54 is in turned moved downwardly by an actuator rod 62 which extends from the lid 18 to the upper end of the intermediate rod 60. The rod 60 is biased upwardly by spring 64 and the rod 62 is biased upwardly by the spring 66. The closure plate 52 will therefore remain closed until the rods 54, 60 and 62 are urged downwardly as will be explained later. An O-ring 68 extends around the periphery of the bottom closure plate 52 and seals it against the bottom 36 to retain water in the canister when the plate 52 is closed.

The top 38 sealingly closes the canister 32 due to an O-ring 70 around the periphery of the top 38. The top 38 contains a gas outlet nozzle 72 having multiple orifices for better dispersion gas exiting the nozzle. A filter 74 is positioned inwardly of the nozzle 72 to prevent any residue from the chemical reaction in the gas generating chamber 40 from passing out through the nozzle 72 into the carbonation chamber 42 and contaminating the beverage therein.

A normally closed pressure relief valve 76 in the flange 36a is connected by a rod 78 to a release ring 80 which is pivotally attached to the canister 32. By pulling on the release ring 80, the valve 76 is opened to release pressure from the gas generation chamber 40 when placing the canister 32 in the bottom of the vessel 12 or to break the vacuum in chamber 40 which would otherwise be created when removing the canister 32 from the vessel.

Figure 2:
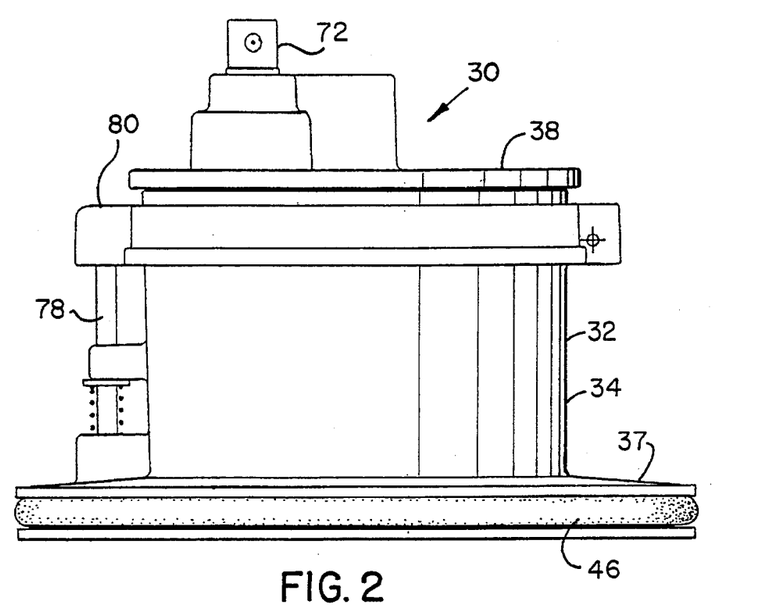
FIG. 2 is side elevational view of the removable partition and water canister used in the apparatus shown in FIG. 1.

FIG. 2 shows the exterior of the canister assembly 30 of FIG. 1 for further understanding of the structure of the invention and like numbers are used to identify the same parts.

Figure 3:
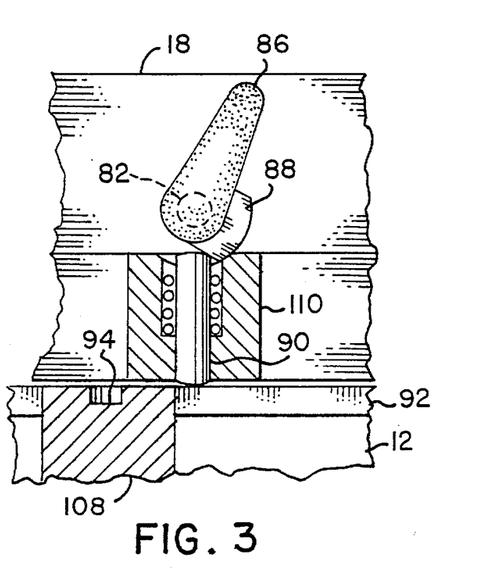
FIG. 3 is a fragmentary elevational view showing the end of a camshaft and turning knob for releasing water from the water canister with the camshaft in the non-release position.
Figure 4:
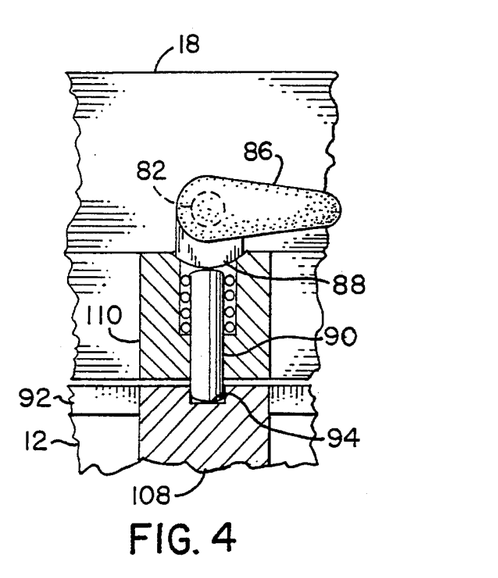
FIG. 4 is a fragmentary elevational view similar to FIG. 3 but showing the camshaft in the water release position.

The lid 18 is formed as a casting or molding and is contoured to retain certain working parts such as a cam shaft 82 which carries an eccentric cam 84 which bears against the upper end of the actuator rod 62 and causes the rod 62 to move downward when the shaft 82 is rotated about its axis. One end of the shaft 82 extends through a hole in the lid 18 and carries a knob 86 on its extended end for manually rotating the shaft 82. A locking cam 88 is associated with the knob 86. As shown in FIG. 3 the lid 18 is in such a relative circumferential position with respect to the vessel 12, that a spring biased lock pin 90 blocks the rotation of the cam 88 to prevent premature actuation of the chemical reaction to generate carbon dioxide before the lid 18 is completely closed and sealed to the vessel 12. The pin 90 held in a raised position by a circumferential flange 92 which extends around the circumference of the vessel 12. Once the lid 18 is screwed onto the vessel 12 to the completely closed position, the pin 90 is aligned with a circular depression 94 and can be moved downwardly into the depression by rotating the cam 88 against the upper end of the pin 90 as shown in FIG. 4. Once the pin 90 is moved into the depression 94 the lid 18 cannot be unscrewed from the vessel 12 until the cam 88 is rotated off of the end of the pin 90. This assures that the lid 18 will not be inadvertently unscrewed while there is still pressure inside the pressure vessel 12.

The lid 18 also has an overpressure safety valve 96 which opens automatically if the pressure within the vessel 12 exceeds a safe limit. In addition as shown in FIG. 1, the lid 18 has a manual pressure release valve 98 extending through a stopper plug 100 which closes the pour outlet opening 102. The release valve restrictively vents the carbonation chamber 42 prior to opening the stopper plug 100. Restrictive venting is necessary to provide a gradual release of gas pressure to prevent the liquid contents from spraying out of the vent as the pressure is released. A pour spout 104 surrounds the opening 102 to direct the flow of the beverage being poured. The arrangement of the stopper 100 and the pour spout 104 is similar to that shown in my prior U.S. Pat. No. 5,260,081 and will not be described in further detail.

A retainer tube 106 surrounding the actuator rod 62, extends downwardly from the lid 18 and bears against the top 38 to hold the canister assembly 30 in operative position within the vessel 12. The vessel 12 has a handle 108 and the lid 18 has a handle extension 110 which is aligned with the handle when the lid 18 is fully screwed into the closed position.

The bottom closure plate 52 of the water canister 32 has a pressure relief valve 112 which opens at very low pressure in the gas generation chamber 40 and serves mainly as a check valve to prevent liquid from running from the bottom of the canister 32 before the plate 52 is opened.

Figure 5:
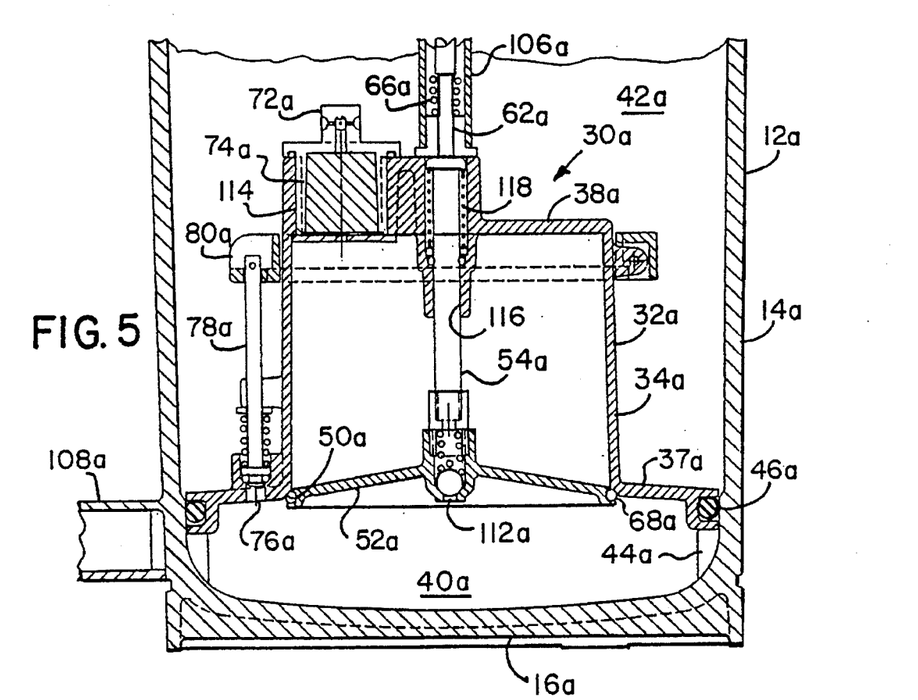
FIG. 5 is a fragmentary elevation sectional view similar to FIG. 1 but showing a different embodiment having a different type of water canister.
Figure 6:
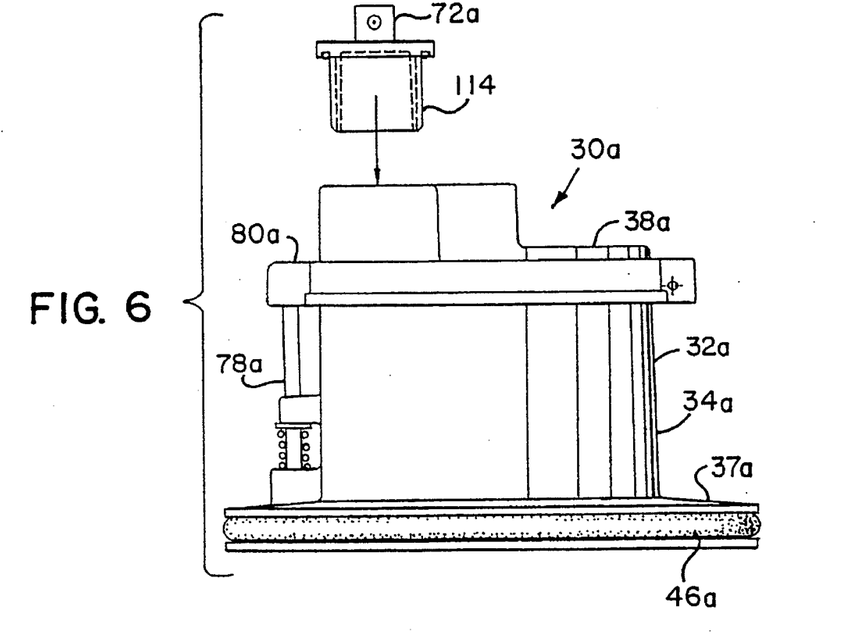
FIG. 6 is a side elevational view of the removable partition and water canister used in the apparatus shown in FIG. 5.

FIGS. 5 and 6 show another embodiment of the canister assembly 30 which is indicated as 30a. It is quite similar to the assembly 30 except for some different design features of the parts. For convenience description similar parts will be given similar numerals to those in FIGS. 1 and 2 except that the numerals will be followed with an a.

The top 38a of canister assembly 30a is permanently attached to the sidewall 34a of the canister 32a. A removable plug 114 is mounted in an opening in the top 38a. The plug 114 contains a gas outlet nozzle 72a and a filter 74a. The canister 32a has the entire bottom open to form drain opening 50a. A bottom closure plate 52a covers the opening 50a and is sealed in the opening by an O-ring 68a. The plate 52a is carried on a center support rod 54a which passes through a bore in the top 38a and is biased upwardly by a spring 118 which holds the plate 52a in normally closed position in the hole 50a so that the canister 32a will retain water until it is released to start the chemical reaction in the gas generation chamber 40a. The top of rod 54a bears against the bottom of actuator rod 62a which operates similar to the rod 62 in FIG. 1

An annular flange 37a extends between the canister wall 34a and the pressure vessel sidewall 14a and is sealed thereto by O-ring 46a. The flange 37a rests on a ledge 44a and divides the pressure vessel 12a into the gas generation chamber 40a and carbonation chamber 42a. The pressure relief valve 76a serves the same function as the valve 76 in FIG. 1 and will not be described in further detail. The check valve 112a operates similar to the valve 112. Thus it can be seen that the embodiment shown in FIGS. 5 and 6 functions substantially the same as that shown in FIGS. 1 and 2.

In operation of the invention the lid 18 is removed from the pressure vessel 12 and the water canister assembly 30 is withdrawn from the vessel 12 while holding the valve 76 open by lifting the ring 80. A measured quantity of carbon dioxide generating compound preferably in powdered form is then placed in the bottom of the vessel 12. The canister 32 is filled with water and the top 38 is placed in position thereon. The entire canister assembly 30 is then reinserted in the vessel 12 and moved downwardly while holding the valve 78 open until the flange 37 rests on the ledge 44. This causes to vessel 12 to be divided into the gas generating chamber 40 containing the gas generating chemical powder at the bottom of the vessel 12 and the carbonation chamber 42 above the chamber 40.

The carbonation chamber is then filled to a desired level with liquid to be carbonated leaving a small headspace at the top of the chamber 42. The liquid can also contain whatever flavoring is selected and a quantity of ice to cool the beverage.

The lid 18 is then screwed in position to close the top of the vessel 12. When the lid 18 is fully screwed into the closed position, the retainer tube 106 bears against the top 38 of the canister 32 and holds the canister assembly 30 in position within the vessel 12.

When the top 18 is in the fully closed position the knob 86 is rotated from the position shown in FIG. 3 to the position shown in FIG. 4. This causes the cam 88 to force the lock pin 90 to enter the depression 94 and prevent the lid 18 from being unscrewed.

Rotation of the knob 86 to the position described above, also rotates the shaft 82 and the cam 84 to a position which forces the actuator rod 62 downward against the rod 60 which then bears against the rod 54 to open the bottom plate 52 and dump the water from the canister 32 onto the powder which has been placed in the gas generating chamber 40. The water mixing with the powder causes a chemical reaction which generates carbon dioxide. The carbon dioxide passes through the water canister 32, the filter 74 and out of the nozzle 72 into the carbonation chamber 42 where it diffuses into the liquid beverage to be carbonated. The mixing of the carbon dioxide with the water is aided by the multi-orifice configuration of the nozzle 72 and can also be aided by shaking the entire vessel 12.

After a short period of time, the carbonation process is completed and by pressing a valve button 120 the valve 98 is opened to restrictively vent the gas pressure from the chamber 42. By pressing downward further on the button 120 and rotating it a short distance the stopper plug 100 is opened downwardly to permit the carbonated beverage to be poured from the spout 104.

Figure 7:
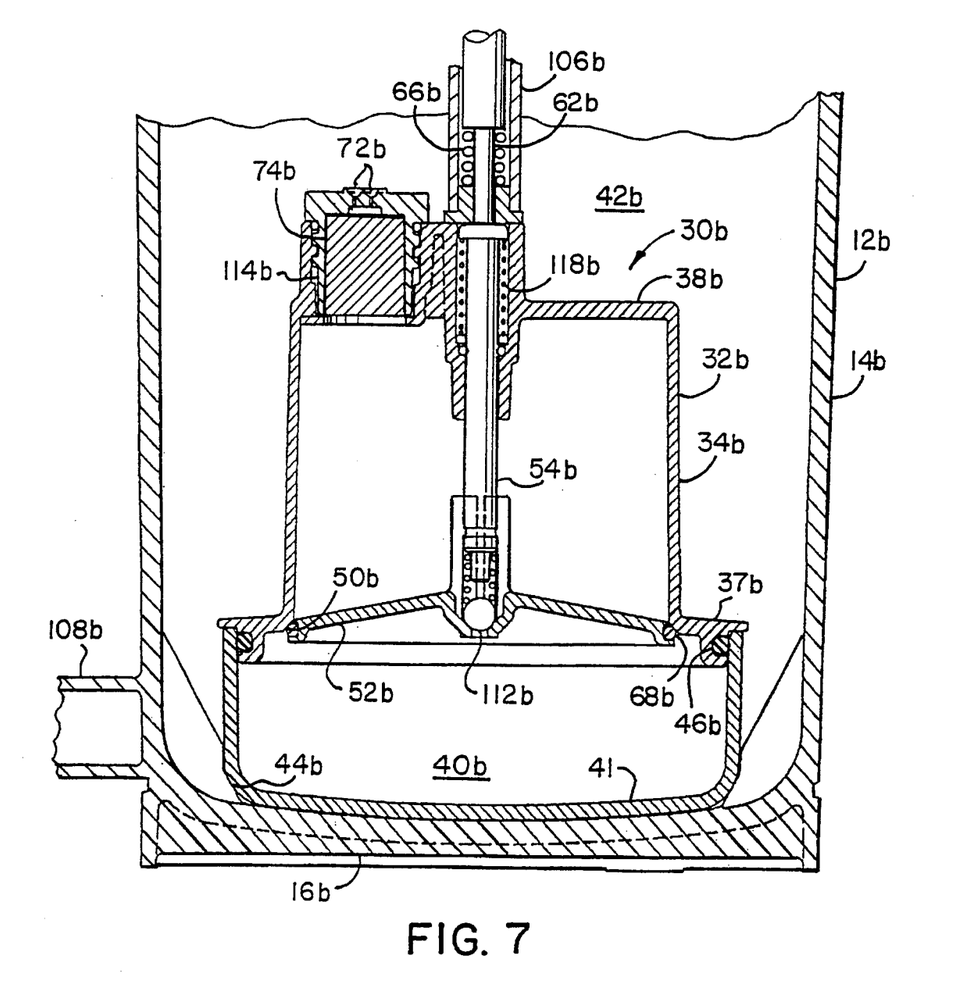
FIG. 7 is fragmentary elevational sectional view similar to FIG. 5 but having a cup shaped member sealingly attached to the bottom of the water canister for holding a carbon dioxide generating compound.

FIG. 7 shows another embodiment of the canister assembly 30a shown in FIGS. 5 and 6. The FIG. 7 canister assembly which is indicated as 30b, is quite similar to the assembly 30a except for some different design features of the parts. For convenience of description similar parts will be given similar numerals to those in FIGS. 5 and 6 except that the numerals will be followed with the letter b.

The top 38b of canister assembly 30b is permanently attached to the sidewall 34b of the canister 32b. A removable plug 114b is screwed into an opening in the top 38b. The plug 114b contains gas outlet nozzles 72b and a filter 74b. The canister 32b has its entire bottom open to form drain opening 50b. A bottom closure plate 52b covers the opening 50b and is sealed in the opening by an O-ring 68b. The plate 52b is carried on a center support rod 54b which passes through a bore in the top 38b and is biased upwardly by a spring 118b which holds the plate 52b in normally closed position in the hole 50b so that the canister 32b will retain water until it is released to start the chemical reaction in the gas generation chamber 40b formed by a cup shaped member 41 sealingly attached to an annular flange 37b which surrounds and extends radially outwardly from the bottom edge of the sidewall 34b. The top of rod 54b bears against the bottom of actuator rod 62b which operates similar to the rod 62 in FIG. 1.

The cup member 41 is sealed to the bottom edge of the water canister 32b by an O-ring 46b carried in an groove in the annular flange 37b. The cup member 41 rests on a ledge 44b which centers it and the entire canister assembly 30b within the carbonation chamber 42b. The check valve 112b operates similar to the valve 112. Thus it can be seen that the embodiment shown in FIG. 7 functions substantially the same as that shown in FIGS. 1 through 6 except that cup member 41 and the bottom of the canister 32b form the gas generating chamber 40b.

The operation of the embodiment shown in FIG. 7 is the same as previously described for the embodiments in FIGS. 1 through 6 except instead of placing the carbon dioxide generating compound directly in the bottom of the pressure vessel 12, the compound is placed in the cup member 41 which is then sealingly attached to the water canister 32b which is then filled with the desired amount of water through the top opening by removing the plug 114b. The plug 114b is then screwed back into the hole in the canister top 38b and the canister assembly 30b is placed inside the vessel 12b with the cup member 41 resting on the ledge 44b. The lid 18 is then screwed onto the top of the vessel 12b and the water is released from the canister 32b in the same manner previously described regarding the other embodiments.

It will be understood that in addition to the modifications shown in FIGS. 5 through 7 with respect to the water canister assemblies 30a and 30b, various other modifications can be made in the valving and actuation of the release of water from the canister 32, 32a or 32b or in other functions of the apparatus without departing from the scope of the invention.

We claim:

1. A process for rapidly carbonating a liquid beverage using a single pressure vessel comprising:

(A) providing a pressure vessel having a top opening therein;

(B) providing a removeable lid for sealingly closing the top opening of the pressure vessel;

(C) inserting a quantity of carbon dioxide generating chemicals in the bottom of the pressure vessel;

(D) inserting a water container means with water in the pressure vessel above the carbon dioxide generating chemicals to divide the pressure vessel into a gas generation chamber below the water container and a carbonation chamber above the water container means with said chemicals contained within the gas generation chamber;

(E) filling the carbonation chamber to a desired level with a liquid to be carbonated;

(F) attaching the lid to sealingly close the top opening of the pressure vessel;

(G) releasing the water from the water container means into the gas generation chamber to mix with the chemicals positioned therein to generate carbon dioxide gas;

(H) permitting the carbon dioxide gas to pass from the gas generation chamber into the carbonation chamber to carbonate the liquid therein;

(I) releasing the pressure from the carbonation chamber; and (J) dispensing the carbonated liquid from the carbonation chamber as needed.

2. The process claimed in claim 1 including the step of retaining the water container means in a fixed position within the pressure vessel.

3. The process claimed in claim 1 including the step opening a bottom closure member in the bottom of the water container means to release the water from the water container means into the gas generation chamber to react with the chemicals therein.

4. The process claimed in claim 3 including the step of opening the bottom closure member by means of an actuator linkage extending from the bottom closure member through the lid of the pressure vessel.

5. The process claimed in claim 1 including the step of releasing pressure through the water container means as the water container means is moved downwardly in the pressure vessel to its operative position.

6. An apparatus for rapidly carbonating a liquid beverage using a single pressure vessel comprising:

(A) a pressure vessel having a top opening therein;

(B) a removably attachable lid sealingly closing the top opening of the pressure vessel;

(C) a removeable partition sealingly dividing the pressure vessel into a carbonation chamber for containing a liquid to be carbonated and a gas generation chamber for containing a quantity of a carbon dioxide generating compound;

(D) a water container associated with the partition for positioning a quantity of water above the gas generation chamber, the water container having a top opening in communication with the carbonation chamber and a bottom opening in communication with the gas generation chamber;

(E) a moveable bottom closure member sealingly closing the bottom opening of the water container to retain water therein;

(F) a top closure member sealingly closing the top opening of the water container to separate the interior of the water container from the carbonation chamber, the top closure member having a gas outlet in communication between the interior of the water container and the carbonation chamber;

(G) retaining means within the carbonation chamber to hold the water container and the removable partition at a fixed location within the pressure vessel;

(H) actuation means extending between the bottom closure member of the water container and the exterior of the pressure vessel to cause opening of the bottom closure member to release water from the water container into the gas generation chamber;

(J) means to release pressure from the carbonation chamber; and (K) outlet means to remove liquid from the carbonation chamber.

7. The apparatus as claimed in claim 6 wherein the actuation means is a moveable linkage extending between the bottom closure member of the water container and the pressure vessel lid.

8. The apparatus as claimed in claim 7 including a means associated with the pressure vessel lid to move the linkage to open the bottom closure member to release water from the water container into the gas generation chamber to mix with the carbon dioxide generating compound placed in the gas generation chamber and to release carbon dioxide from the gas generation chamber into the carbonation chamber to carbonate liquid in the carbonation chamber.

9. The apparatus as claimed in claim 8 wherein the means to move the linkage is a rotary cam which engages an upper end of the linkage.

10. The apparatus as claimed in claim 6 wherein the gas outlet in the top closure member of the water container is a nozzle configuration.

11. The apparatus as claimed in claim 6 wherein a filter is mounted in association with the gas outlet in the top closure member of the water container.

12. The apparatus as claimed in claim 6 including means to release pressure from the gas generation chamber through the partition into the carbonation chamber to avoid airlock when moving the partition up or down in the pressure vessel.

13. The apparatus as claimed in claim 6 including pressure release means mounted in the bottom closure member of the water container.

14. The apparatus as claimed in claim 6 wherein the retaining means for holding the water container and the removable partition in a fixed location within the pressure vessel is an elongated member attached to the lid of the pressure vessel and extending downwardly through the carbonation chamber to bear against a top portion of the water container.

15. The apparatus as claimed in claim 6 wherein the pressure vessel is a pitcher shaped container having a handle and pouring spout adjacent to the outlet means for removing the liquid from the carbonation chamber.

16. The apparatus as claimed in claim 6 wherein the liquid outlet means has a gas pressure relief means therein for releasing the pressure from within the carbonation chamber.

17. The apparatus as claimed in claim 16 wherein the gas pressure relief means restrictively vents the pressure from the carbonation chamber.

18. An apparatus for rapidly carbonating a liquid beverage using a single pressure vessel comprising:

(A) a pressure vessel having a top opening therein;

(B) a removably attachable lid sealingly closing the top opening of the pressure vessel;

(C) a removeable partition sealingly dividing the pressure vessel into a carbonation chamber for containing a liquid to be carbonated and a gas generation chamber for containing a quantity of a carbon dioxide generating compound;

(D) a water container associated with the partition for positioning a quantity of water above the gas generation chamber, the water container having a top opening in communication with the carbonation chamber and a bottom opening in communication with the gas generation chamber;

(E) a moveable bottom closure member sealingly closing the bottom opening of the water container to retain water therein;

(F) a top closure member sealingly closing the top opening of the water container to separate the interior of the water container from the carbonation chamber, the top closure member having a gas outlet in communication between the interior of the water container and the carbonation chamber;

(G) a first linkage means within the carbonation chamber extending between the pressure vessel lid and the top closure member of the water container to hold the water container and the removable partition at a fixed location within the pressure vessel;

(H) a second linkage means extending between the bottom closure member of the water container and the pressure vessel lid to cause opening of the bottom closure member to release water from the water container into the gas generation chamber;

(I) means associated with the pressure vessel lid to move the second linkage means to open the bottom closure member to release water from the water container into the gas generation chamber to mix with the carbon dioxide generating compound placed in the gas generation chamber and to release carbon dioxide from the gas generation chamber into the carbonation chamber to carbonate liquid placed in the carbonation chamber;

(J) means in the pressure vessel lid to release pressure from the carbonation chamber; and (K) outlet means to remove liquid from the carbonation chamber.

19. A process for rapidly carbonating a liquid beverage using a single pressure vessel comprising:

(A) providing a pressure vessel having a top opening therein;

(B) providing a removeable lid for sealingly closing the top opening of the pressure vessel to form a carbonation chamber on the interior of the pressure vessel;

(C) inserting into the pressure vessel a container assembly which provides a gas generation chamber containing a quantity of carbon dioxide generating compound and a water container means temporarily retaining a quantity of water above the gas generation chamber;

(D) filling the carbonation chamber to a desired level with a liquid to be carbonated;

(E) attaching the lid to sealingly close the top opening of the pressure vessel;

(F) releasing the water from the water container means into the gas generation chamber to mix with the chemicals positioned therein to generation carbon dioxide gas;

(G) permitting the carbon dioxide gas to pass from the gas generation chamber into the carbonation chamber to carbonate the liquid therein;

(H) releasing the pressure from the carbonation chamber; and (I) dispensing the carbonated liquid from the carbonation chamber as needed.

20. The process claimed in claim 19 including the step of retaining the container assembly in a fixed position within the pressure vessel.

21. The process claimed in claim 19 including the step of opening a bottom closure member in the bottom of the water container means, to release the water from the water container means into the gas generation chamber to react with the compound therein.

22. The process claimed in claim 21 including the step of opening the bottom closure member by means of an actuator linkage extending from the bottom closure member through the lid of the pressure vessel.

23. The process claimed in claim 19 including the steps of placing a quantity of carbon dioxide generating compound in a cup shaped member and sealingly attaching the cup shaped member to the bottom of the water container means to form the gas generation chamber prior to inserting the container assembly into the pressure vessel.

24. An apparatus for rapidly carbonating a liquid beverage using a single pressure vessel comprising:

(A) a pressure vessel having a top opening therein;

(B) a removably attachable lid sealingly closing the top opening of the pressure vessel to form a carbonation chamber on the interior of the pressure vessel;

(C) a removeable container assembly positioned inside the pressure vessel at the bottom thereof, the container assembly forming a gas generation chamber at the bottom of the assembly for containing a quantity of carbon dioxide generating compound, and a water container above the gas generation chamber for retaining a quantity of water, the water container having a top opening in communication with the carbonation chamber and a bottom opening in communication with the gas generation chamber;

(D) a moveable bottom closure member sealingly closing the bottom opening of the water container to retain water therein;

(E) a top closure member closing the top opening of the water container to separate the interior of the water container from the carbonation chamber, the top closure member having a gas outlet in communication between the interior of the water container and the carbonation chamber;

(F) retaining means within the carbonation chamber to hold the container assembly at a fixed location within the pressure vessel;

(G) actuation means extending between the bottom closure member of the water container and the exterior of the pressure vessel to cause opening of the bottom closure member to release water from the water container into the gas generation chamber;

(H) means to release pressure from the carbonation chamber; and (I) outlet means to remove liquid from the carbonation chamber.

25. The apparatus as claimed in claim 24 wherein the gas generation chamber is formed by a cup shaped member which sealingly engages a bottom edge of the water container around the entire circumference thereof.

26. The apparatus as claimed in claim 24 wherein the actuation means is a moveable linkage extending between the bottom closure member of the water container and the pressure vessel lid.

27. The apparatus as claimed in claim 26 including a means associated with the pressure vessel lid to move the linkage to open the bottom closure member to release water from the water container into the gas generation chamber to mix with the carbon dioxide generating compound placed in the gas generation chamber and to release carbon dioxide from the gas generation chamber into the carbonation chamber to carbonate liquid in the carbonation chamber.

28. The apparatus as claimed in claim 27 wherein the means to move the linkage is a rotary cam which engages an upper end of the linkage.

29. The apparatus as claimed in claim 24 wherein the gas outlet in the top closure member of the water container is a nozzle configuration.

30. The apparatus as claimed in claim 24 wherein a filter is mounted in association with the gas outlet in the top closure member of the water container.

31. The apparatus as claimed in claim 24 including pressure release means mounted in the bottom closure means of the water container.

32. The apparatus as claimed in claim 24 wherein the retaining means for holding the water container and the removable partition in a fixed location within the pressure vessel is an elongated member attached to the lid of the pressure vessel and extending downwardly through the carbonation chamber to bear against a top portion of the water container.

33. The apparatus as claimed in claim 24 wherein the pressure vessel is a pitcher shaped container having a handle and pouring spout adjacent to the outlet means for removing the liquid from the carbonation chamber.

34. The apparatus as claimed in claim 24 wherein the liquid outlet means has a gas pressure relief means therein for releasing the pressure from within the carbonation chamber.

35. The apparatus as claimed in claim 24 wherein the gas pressure relief means restrictively vents the pressure from the carbonation chamber.

36. An apparatus for rapidly carbonating a liquid beverage comprising:

(A) a pressure vessel having a top opening therein;

(B) a removably attachable lid sealingly closing the top opening of the pressure vessel to form a carbonation chamber on the interior of the pressure vessel;

(C) a removeable container assembly adapted to be positioned in communication with the carbonation chamber, the container assembly when assembled, being capable of forming a gas generation chamber at the bottom of the assembly for containing a quantity of carbon dioxide generating compound, and a water container above the gas generation chamber for retaining a quantity of water, the water container having a bottom opening in communication with the gas generation chamber;

(D) a moveable bottom closure member sealingly closing the bottom opening of the water container to retain water therein;

(E) a top closure member closing the top opening of the water container;

(F) retaining means to hold the container assembly at a fixed position relative to the pressure vessel and to retain the container assembly in an assembled position to form a gas generation chamber capable of containing and releasing pressure generated therein during the generation of carbon dioxide gas;

(G) actuation means extending between the bottom closure member of the water container and the exterior of the container assembly to cause opening of the bottom closure member to release water from the water container into the gas generation chamber;

(H) means to release pressure from the carbonation chamber; and (I) outlet means to remove liquid from the carbonation chamber.

37. The apparatus as claimed in claim 36 wherein said gas generation chamber will become a pressure vessel only after the retaining means engages the container assembly to retain it in the assembled position and at a fixed position relative to the pressure vessel.

38. An apparatus for rapidly carbonating a liquid beverage comprising:

(A) a pressure vessel forming a carbonation chamber on the interior thereof;

(B) a removeable container assembly adapted to be positioned in a fixed position relative to the pressure vessel, the container assembly when assembled, being capable of forming a gas generation chamber at the bottom of the assembly for containing a quantity of carbon dioxide generating compound, and a water container above the gas generation chamber for retaining a quantity of water, the water container having a bottom opening in communication with the gas generation chamber;

(C) a moveable bottom closure member sealingly closing the bottom opening of the water container to retain water therein;

(D) retaining means to hold the container assembly at a fixed location relative to the pressure vessel and to retain the container assembly in an assembled position to form a gas generation chamber capable of containing and releasing pressure generated therein during the generation of carbon dioxide gas;

(E) actuation means to cause opening of the bottom closure member to release water from the water container into the gas generation chamber;

(F) connecting means extending between the carbon dioxide generating chamber and the carbonation chamber to permit carbon dioxide gas to flow from the generation chamber to the carbonation chamber;

(G) means to release pressure from the carbonation chamber; and (H) outlet means to remove liquid from the carbonation chamber.

39. The apparatus as claimed in claim 38 wherein said gas generation chamber will become a pressure vessel only after the retaining means engages the container assembly to retain it in the assembled position.

40. The apparatus as claimed in claim 38 wherein said gas generation chamber will become a pressure vessel only after the container assembly is retained in a fixed position relative to the carbonation chamber.

41. The apparatus as claimed in claim 38 including means rapidly venting any carbon dioxide gas which may be prematurely generated in the gas generation chamber prior the retaining means being fully engaged with the container assembly.

* * * * *